April 8, 1947.  W. T. DAMRELL  2,418,626
INSIDE-OUTSIDE PIPE GRIP
Filed April 6, 1945  2 Sheets-Sheet 1

Inventor
William T. Damrell.
By Clarence A. O'Brien
and Harvey B. Jacobson
Attorneys April 8, 1947. W. T. DAMRELL 2,418,626
INSIDE-OUTSIDE PIPE GRIP
Filed April 6, 1945 2 Sheets-Sheet 2
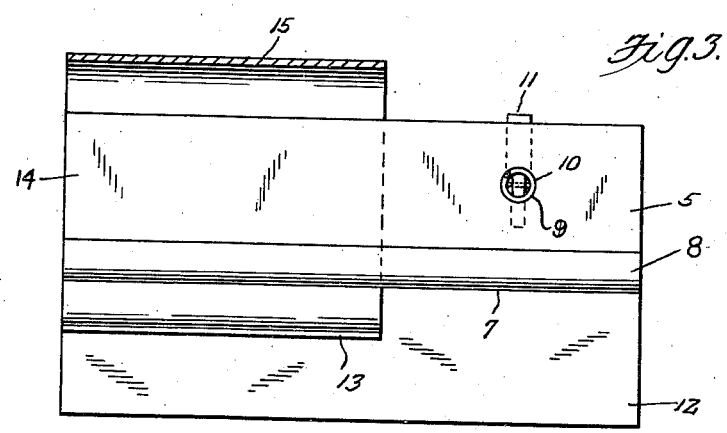
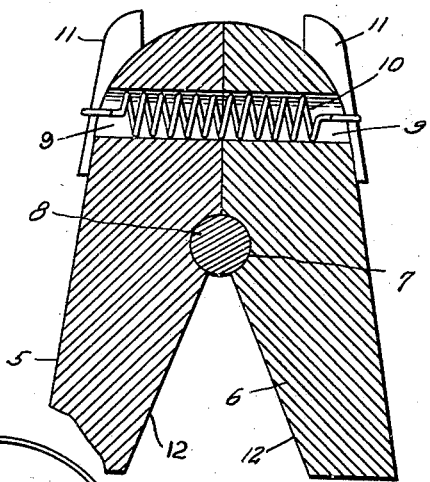
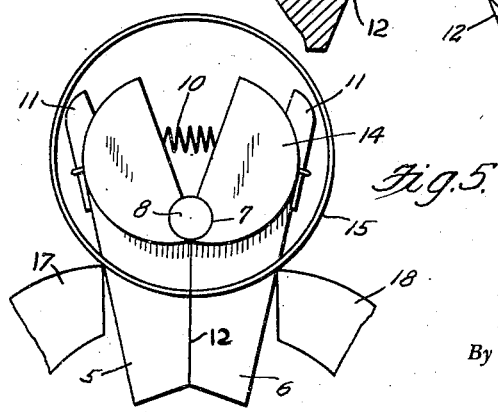
Inventor
William T. Damrell.
By Clarence A. O'Brien
and Harvey B. Jacobson
Attorneys Patented Apr. 8, 1947

2,418,626

UNITED STATES PATENT OFFICE 2,418,626

INSIDE-OUTSIDE PIPE GRIP

William T. Damrell, Mooresville, Mo.

Application April 6, 1945, Serial No. 586,875

3 Claims. (Cl. 81—39)

The present invention relates to new and useful improvements in devices for holding pipes, sleeves and other tubular members and is designed particularly for use for holding sleeves adapted for fitting on struts in airplane construction and the invention has for its primary object to provide a device of this character by means of which the sleeve is gripped internally as well as externally and firmly held against damage by mashing, mutilating or scratching the surface of the sleeve.

A further important object of the invention is to provide a pipe or sleeve holding device of this character embodying means for engagement by the jaws of a vise to clamp the device about one end of the sleeve or pipe.

A further object of the invention is to provide an internal expansible cylinder adapted for engagement on the inside of a sleeve or pipe together with a contractible sleeve adapted for clamping engagement on the outside of the pipe, both the cylinder and the sleeve being connected for simultaneous expanding and contracting movement into and out of clamping engagement respectively on the inside and outside of a sleeve or other work.

Another object of the invention is to provide pivotally connected actuating levers for the expansible and contractible members extending longitudinally at the outer surface thereof and adapted for actuation by the opening and closing movement of the jaws of a vise.

Another object is to provide a device of this character of simple and practical construction, which is efficient and reliable in use, relatively inexpensive to manufacture and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 3 is a longitudinal sectional view taken substantially on a line 3—3 of Figure 2.

Figure 4 is a transverse sectional view taken on a line 4—4 of Figure 1.

Figure 5 is an end elevational view showing the device in pipe or sleeve clamping position.

Figure 1:
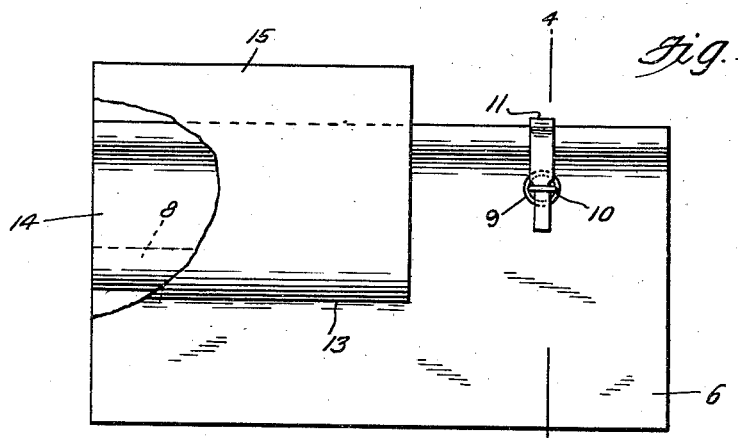
Figure 1 is a side elevational view.

Referring now to the drawings in detail wherein for the purpose of illustration I have disclosed a preferred embodiment of the invention, the numerals 5 and 6 designate a pair of levers arranged in facing contact with each other and formed on their opposed faces with longitudinally extending grooves 7 adapted for receiving a hinge pin 8.

Transversely extending aligned openings 9 are formed in the levers 5 and 6 in which is positioned a coil spring 10 with its ends projecting outwardly from the outer surfaces of the respective levers and engaging locking keys 11, the spring serving to yieldably maintain the upper opposed faces of the levers in closed position with respect to each other as indicated in Figure 4 of the drawings whereas the opposed faces 12 of the levers at the lower edges thereof are inclined in outwardly diverging relation from the pin 8 to be maintained in spaced apart open position by the spring 10.

A portion of the levers 5 and 6 at one end thereof and adjacent the groove 7 is cut away along the line indicated at 13 to receive the split edges of a longitudinally split sleeve 15 of resilient material, the split edges of the sleeve being welded or otherwies suitably secured to the respective levers 5 and 6 in a position for surrounding the segments of the cylinder 14 in spaced relation therefrom.

Figure 2:
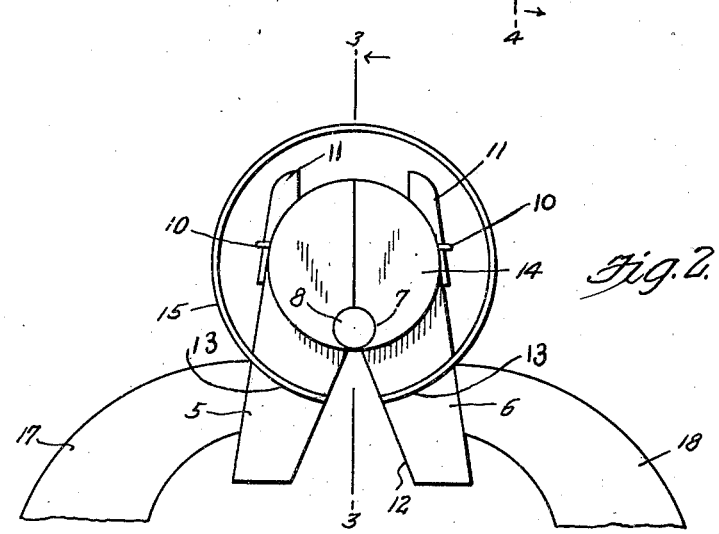
Figure 2 is an end elevational view showing the pipe or sleeve holder held in position between the jaws of a vise.
Figure 6:
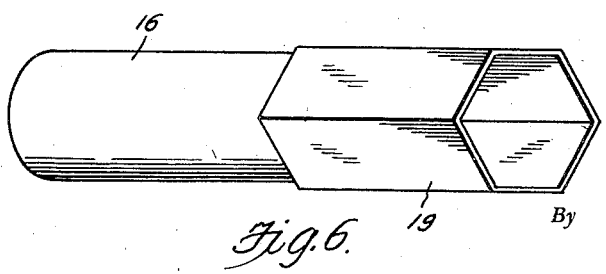
Figure 6 is a perspective view of a type of sleeve to be held in position.

The pin 8 extends longitudinally along the lower edge of the cylinder 14 so that upon a closing movement of the lower edges of the levers 5 and 6 the segments of the cylinder 14 will swing away from each other at their upper edges from the position as shown in Figure 2 of the drawings to that shown in Figure 5 and at the same time the sleeve 15 will be contracted.

Accordingly, by inserting the end of a sleeve, such as indicated at 16, between the cylinder 14 and the sleeve 15 the segments of the cylinder will be expanded against the inside of the sleeve while the sleeve 15 will be contracted about the outer surface of the sleeve 16 and thus serve to internally and externally grip the sleeve 16 in tight clamping engagement.

By inserting the lower edges of the levers 5 and 6 between the jaws 17 and 18 of a vise the levers 5 and 6 will be moved inwardly toward each other to thus expand and contract the cylinder 14 and sleeve 15 respectively, about a pipe or sleeve mounted therein.

The sleeve 16 is of a type adapted for fitting over a strut of conventional construction used in airplane assembly, one end of the sleeve 16 being formed with a hexagonal portion 19 to receive a retaining nut carried by the strut.

In view of the foregoing description taken in conjunction with the accompanying drawings it is believed that a clear understanding of the construction, operation and advantages of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

Having thus described the invention, what I claim as new is:

1. A holder for gripping a sleeve internally and externally comprising a pair of levers hinged together for relative swinging in a separative direction on one side of the pivot and toward each other on the other side of said pivot, a pair of opposed relatively separable internal gripping members on said levers on the first mentioned side of said pivot adapted to be inserted in the sleeve and to be separated by separation of said levers on the first mentioned side of the pivot, an external gripping contractile member on said levers surrounding the pair of members for receiving the sleeve therein and connected to said levers on the second mentioned side of the pivot for contraction by movement of said levers toward each other on the second mentioned side of said pivot.

2. A holder for gripping a sleeve internally and externally comprising a pair of levers hinged together for relative swinging in a separative direction on one side of the pivot and toward each other on the other side of said pivot, a pair of opposed relatively separable internal gripping members on said levers on the first mentioned side of said pivot adapted to be inserted in the sleeve and to be separated by separation of said levers on the first mentioned side of the pivot, an external gripping contractile member on said levers surrounding the pair of members for receiving the sleeve therein and connected to said levers on the second mentioned side of the pivot for contraction by movement of said levers toward each other on the second mentioned side of said pivot, said pair of members being of segmental form.

3. A holder for gripping a sleeve internally and externally comprising a pair of levers hinged together for relative swinging in a separative direction on one side of the pivot and toward each other on the other side of said pivot, a pair of opposed relatively separable internal gripping members on said levers on the first mentioned side of said pivot adapted to be inserted in the sleeve and to be separated by separation of said levers on the first mentioned side of the pivot, an external gripping contractile member on said levers surrounding the pair of members for receiving the sleeve therein and connected to said levers on the second mentioned side of the pivot for contraction by movement of said levers toward each other on the second mentioned side of said pivot, said contractible member having the form of a longitudinally split sleeve of resilient material with the edges thereof on opposite sides of the split anchored in said levers.

WILLIAM T. DAMRELL.

REFERENCES CITED

The following references are of record in the file of this patent:

UNITED STATES PATENTS

| Number | Name | Date |
|---|---|---|
| 465,959 | Yerdon | Dec. 29, 1891 |
| 1,721,111 | Graf | July 16, 1929 |
| 619,553 | Fox | Feb. 14, 1899 |
| 1,945,912 | Penfield | Feb. 6, 1934 |
| 2,153,828 | Fleming | Apr. 11, 1939 |
| 1,816,997 | Brown | Aug. 4, 1931 |
| 1,862,273 | McGuckin | June 7, 1932 |